US011663767B2

(12) United States Patent
Hakura et al.

(10) Patent No.: US 11,663,767 B2
(45) Date of Patent: May 30, 2023

(54) POWER EFFICIENT ATTRIBUTE HANDLING FOR TESSELLATION AND GEOMETRY SHADERS

(71) Applicant: NVIDIA CORPORATION, Santa Clara, CA (US)

(72) Inventors: Ziyad S. Hakura, Gilroy, CA (US); Dale L. Kirkland, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 268 days.

(21) Appl. No.: 13/772,182

(22) Filed: Feb. 20, 2013

(65) Prior Publication Data
US 2014/0232729 A1    Aug. 21, 2014

(51) Int. Cl.
G06T 15/00    (2011.01)
G06T 1/60    (2006.01)
G06F 9/50    (2006.01)

(52) U.S. Cl.
CPC .......... *G06T 15/005* (2013.01); *G06F 9/5022* (2013.01); *G06F 9/5094* (2013.01); *G06T 1/60* (2013.01); *G06T 2210/52* (2013.01); *Y02D 10/00* (2018.01)

(58) Field of Classification Search
CPC .................................................. G06T 15/005
USPC .................................. 345/501–503, 505–506
See application file for complete search history.

(56) References Cited

U.S. PATENT DOCUMENTS

| 5,978,370 | A | * | 11/1999 | Shively | ................ H04Q 11/06 370/411 |
| 6,070,194 | A | * | 5/2000 | Yu et al. | ...................... 709/229 |
| 7,065,630 | B1 | * | 6/2006 | Ledebohm | .......... G06F 12/1081 710/8 |
| 2005/0138622 | A1 | * | 6/2005 | McAlpine | ............. G06F 9/3851 718/100 |

(Continued)

FOREIGN PATENT DOCUMENTS

CN    102598063 A    7/2012
TW    201142740 A    12/2011

OTHER PUBLICATIONS

Nickolls, et al., "The GPU Computing Era", Published by the IEEE Computer Society, Mar./Apr. 2010, pp. 56-69.

(Continued)

*Primary Examiner* — Yi Yang
(74) *Attorney, Agent, or Firm* — Artegis Law Group, LLP

(57) ABSTRACT

Attributes of graphics objects are processed in a plurality of graphics processing pipelines. A streaming multiprocessor (SM) retrieves a first set of parameters associated with a set of graphics objects from a first set of buffers. The SM performs a first set of operations on the first set of parameters according to a first phase of processing to produce a second set of parameters stored in a second set of buffers. The SM performs a second set of operations on the second set of parameters according to a second phase of processing to produce a third set of parameters stored in a third set of buffers. One advantage of the disclosed techniques is that work is redistributed from a first phase to a second phase of graphics processing without having to copy the attributes to and retrieve the attributes from the cache or system memory, resulting in reduced power consumption.

22 Claims, 9 Drawing Sheets

(56) References Cited

U.S. PATENT DOCUMENTS

2009/0284537 A1* 11/2009 Hong .................. G06T 1/60
                                                    345/522
2011/0080404 A1*  4/2011 Rhoades ............. G06T 15/005
                                                    345/423
2011/0084975 A1*  4/2011 Duluk et al. ................ 345/522
2011/0084976 A1*  4/2011 Duluk et al. ................ 345/522
2011/0304634 A1* 12/2011 Urbach ........................ 345/501

OTHER PUBLICATIONS

Purcell, "Fast Tessellated Rendering on Fermi GF100", Nvidia, Hot3D @ HPG 2010, 29 pages.

* cited by examiner

POWER EFFICIENT ATTRIBUTE HANDLING FOR TESSELLATION AND GEOMETRY SHADERS

BACKGROUND OF THE INVENTION

Field of the Invention

The present invention generally relates to three-dimensional (3D) graphics processing, and, more particularly, to power efficient attribute handling for tessellation and geometry shaders.

Description of the Related Art

Computer generated images that include 2D and 3D graphics objects are typically rendered using a graphics processing unit (GPU) with one or more multistage graphics processing pipelines. Such graphics pipelines include various programmable and fixed function stages. Programmable stages include various processing units that execute shader programs to render graphics objects and to generate various visual effects associated with graphics objects.

For efficient processing, graphics objects are typically distributed among the multistage graphics processing pipelines such that each graphics processing pipeline has approximately the same amount of workload. As the graphics objects are processed in the graphics processing pipelines, there may be a high degree of workload expansion in one or more of the graphics processing pipelines. For example, the surface of a graphics object could be subdivided into a quantity of smaller graphics objects, such as triangles, in a process known as tessellation. The quantity of smaller graphics objects produced by tessellation could vary greatly from one graphics object to another. As a result, the workload of the graphics processing pipelines could become unbalanced during tessellation, even when the workload of the pipelines is balanced prior to tessellation. Graphics processing pipelines with a relatively low workload could complete processing early. Such graphics processing pipelines could enter an idle state, pending completion of processing by graphics processing pipelines with a relatively high workload. Such an unbalanced workload among the graphics processing pipelines could reduce efficiency of the GPU.

One possible solution to this problem is to rebalance the workload among the graphics processing pipelines at the tessellation stage. Processing of various graphics objects may then be processed by a different graphics processing pipeline after the rebalance than prior to the rebalance. Before rebalancing, the graphics processing pipelines copy the attributes of the graphics objects from a local memory to a cache or system memory. After rebalancing, the graphics processing pipelines retrieve the attributes of the graphics objects from the cache or system memory according to the rebalanced workload assignments and copy the attributes to local memory. One drawback with this approach is that power is consumed when attributes are transferred between the local memory and the cache or system memory. In low-power applications, such as when the GPU is associated with a mobile device, power consumed when data is written to and read from cache or system memory reduces the battery life of the mobile device and, consequently, the available operating time of the device.

As the foregoing illustrates, what is needed in the art is an improved technique for rebalancing workload in a graphics processing pipeline.

SUMMARY OF THE INVENTION

One embodiment of the present invention sets forth a method for processing attributes of graphics objects in a plurality of graphics processing pipelines. The method includes retrieving a first set of parameters associated with a set of graphics objects from a first set of buffers. The method further includes performing a first set of operations on the first set of parameters according to a first phase of processing to produce a second set of parameters, and storing the second set of parameters in a second set of buffers. The method further includes performing a second set of operations on the second set of parameters according to a second phase of processing to produce a third set of parameters, and storing the third set of parameters in a third set of buffers.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing device configured to implement one or more aspects of the disclosed methods.

One advantage of the disclosed techniques is that work is redistributed single streaming multiprocessor system from a first phase of graphics processing to a second phase of graphics processing without having to copy the attributes of the graphics objects to the cache or system memory and then later retrieve the attributes from one of those memories. Copying attributes to and retrieving attributes from a remote memory, such as the cache or system memory, typically involves energizing multiple off-chip memory, controller, and interface components in a multilevel memory hierarchy. Copying to and retrieving from a remote memory may also involve transitioning some components from a low power consumption state to a high power consumption state. Accessing a local shared memory typically does not involve energizing or changing power state of off-chip components. Consequently, the disclosed techniques reduce overall power consumption and serve to extend the operating time between battery charging cycles in mobile devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
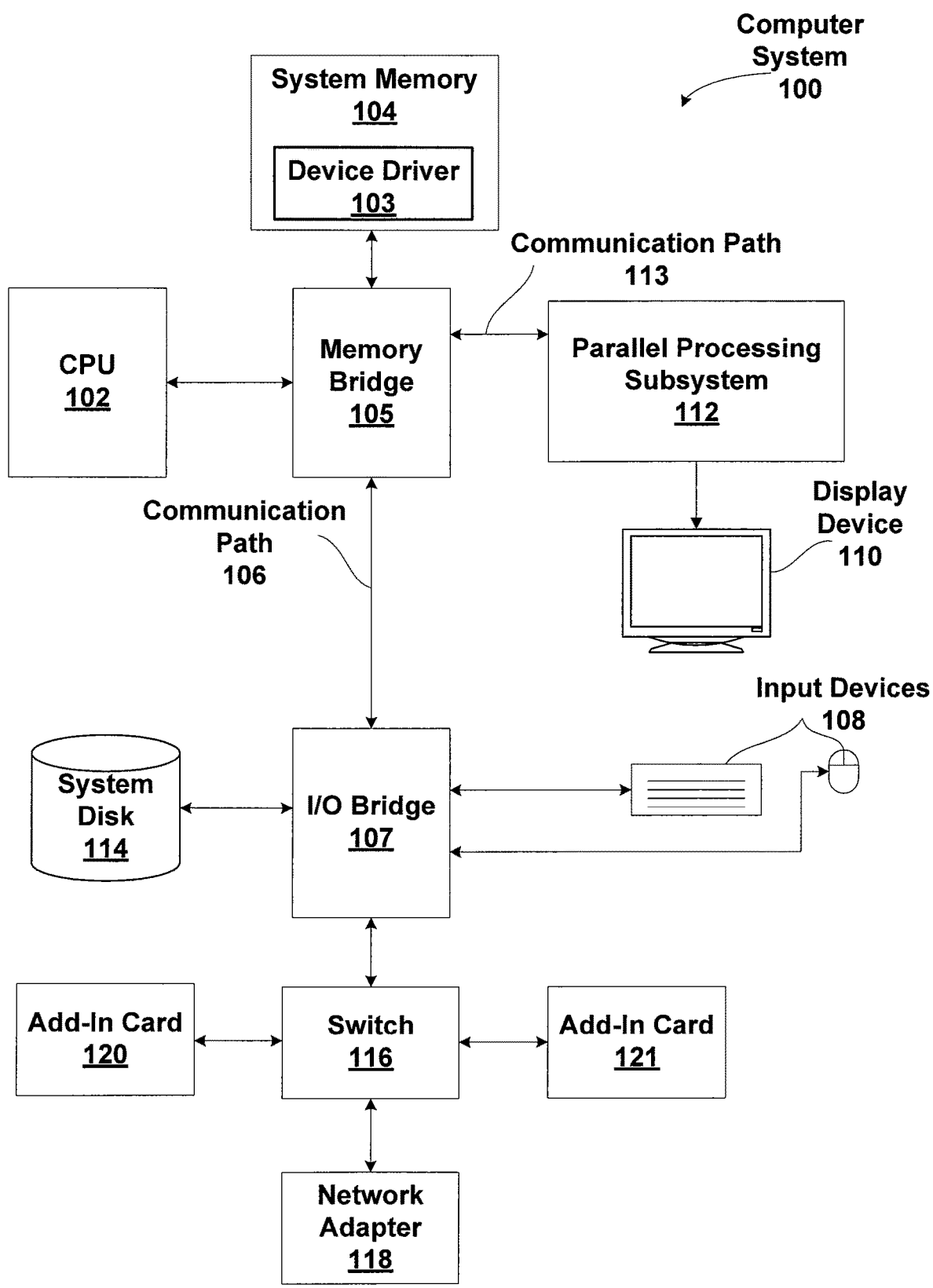
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol (s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
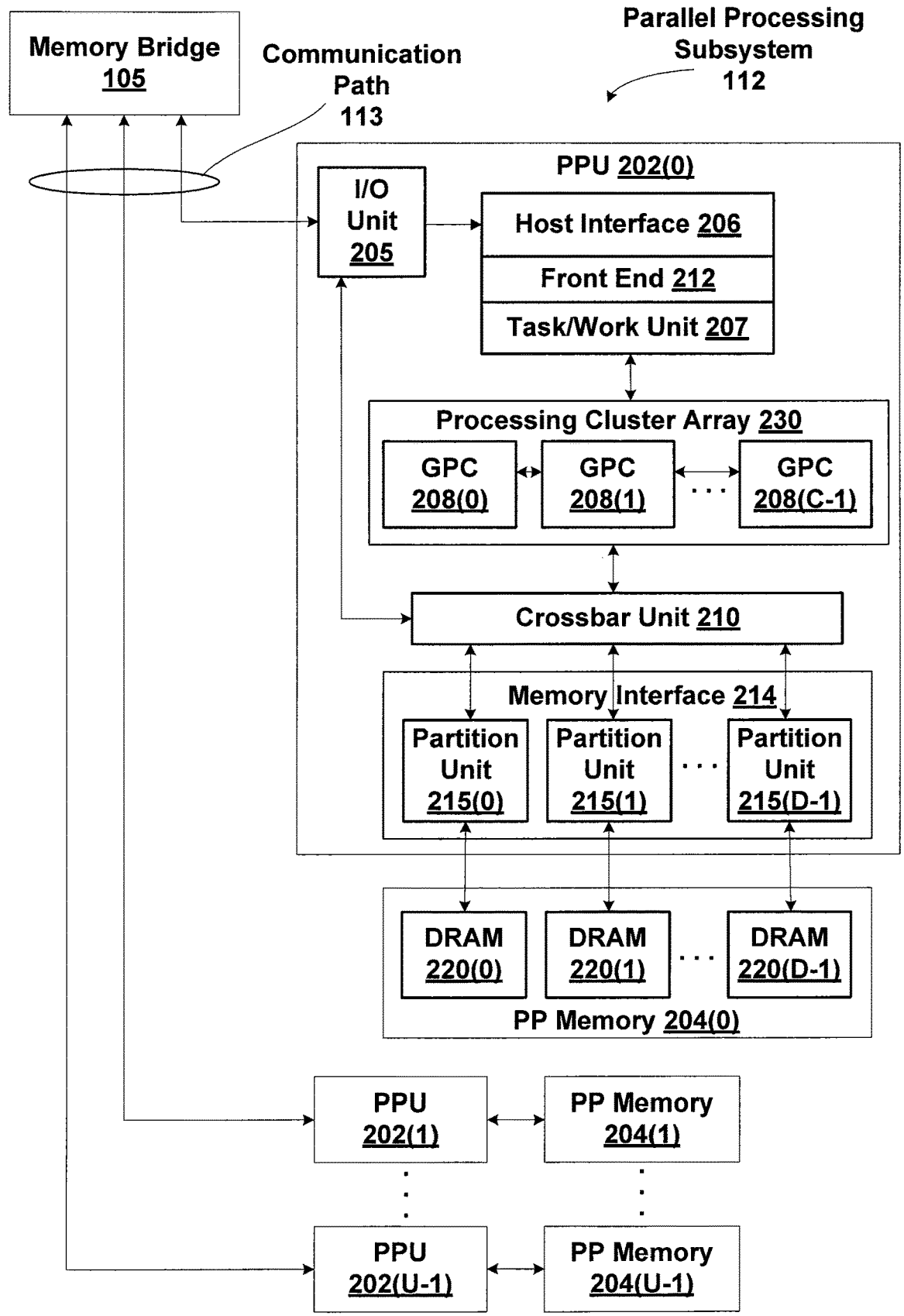
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
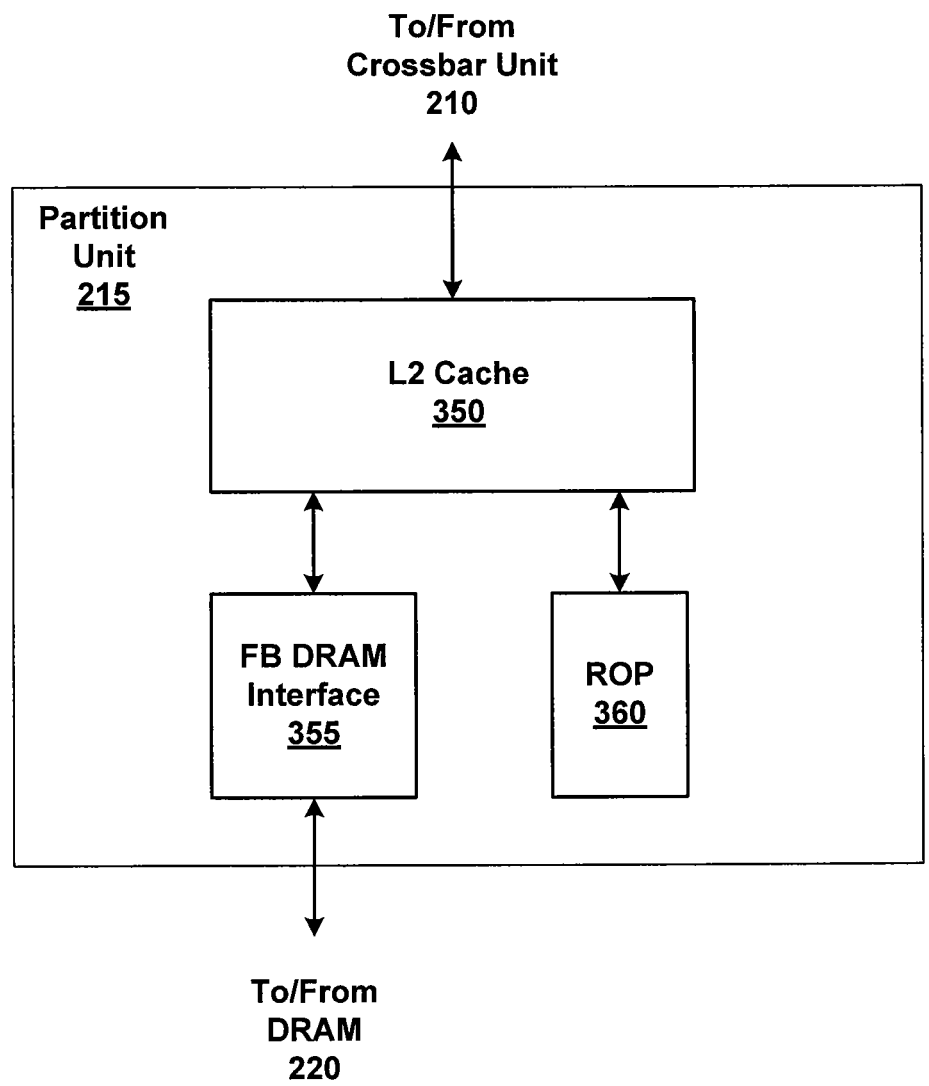
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
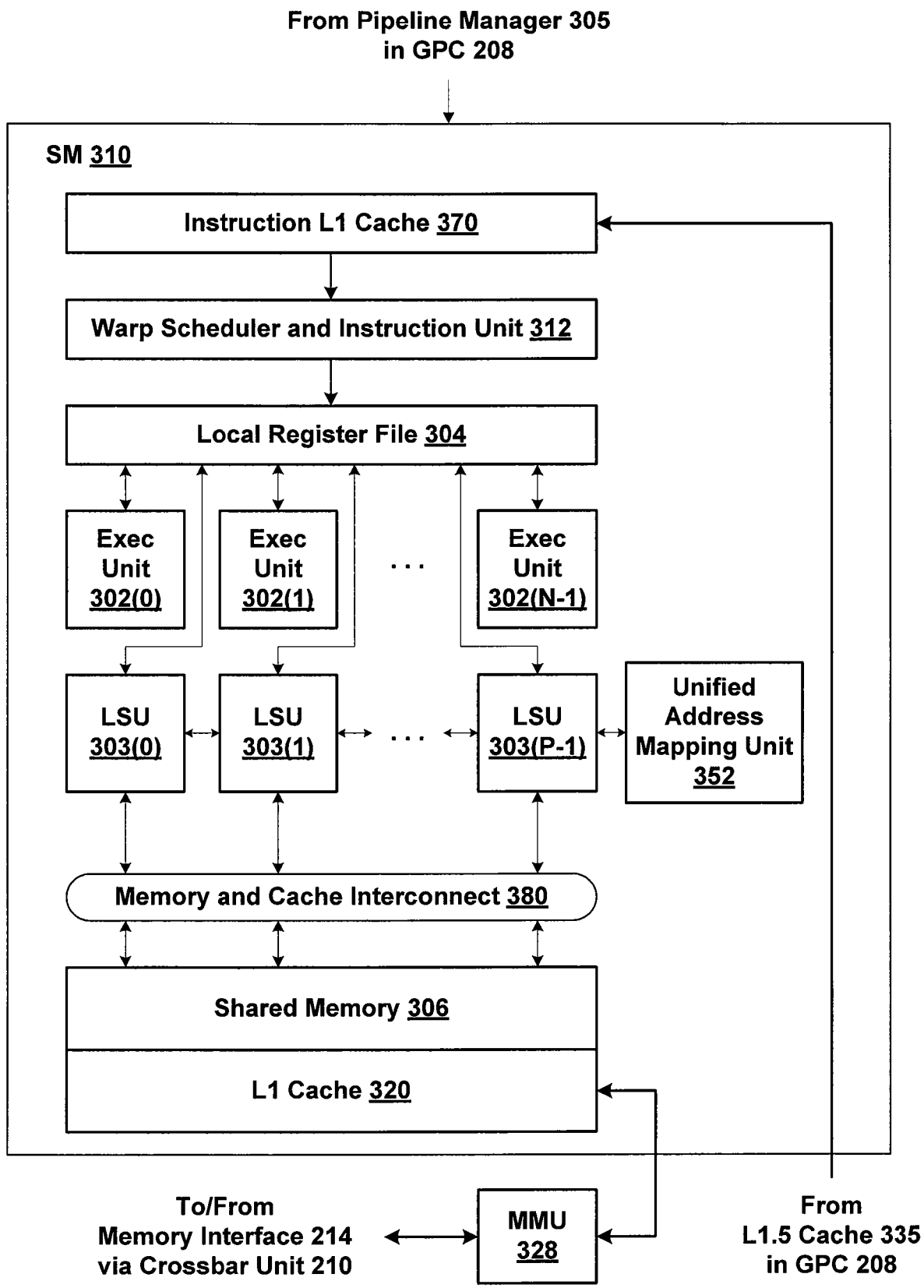
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays.

Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
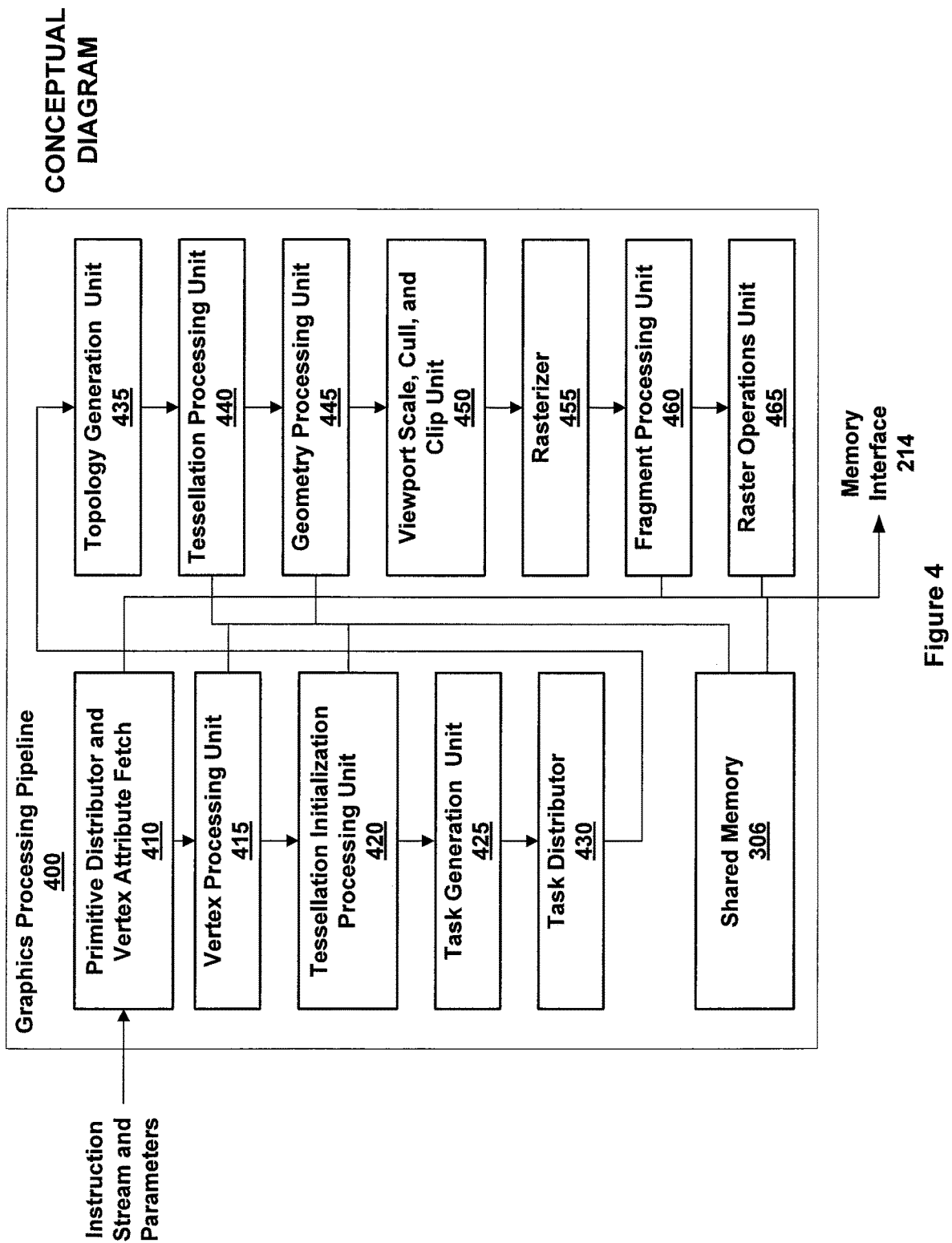
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a tessellation initialization processing unit 420, a tessellation processing unit 440, a geometry processing unit 445, and a fragment processing unit 460. The functions of primitive distributor and vertex attribute fetch 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215. Alternately, graphics processing pipeline 400 may be implemented using dedicated processing units for one or more functions.

The graphics processing pipeline 400 also includes a local memory that is shared among the graphics processing pipelines 400. For example, the graphics processing pipeline could use the shared memory 306 within the SM 310 as such a local memory. As further described below, inter-stage buffers (not shown) within the shared memory 306 are allocated and deallocated by the various processing units in the graphics processing pipeline 400 as needed. A processing unit reads input data from one or more inter-stage buffers, processes the input data to produce output data, and stores the resulting output data in one or more inter-stage buffers. A subsequent processing unit may read this resulting output data as input data for the subsequent processing unit. The subsequent processing unit processes the data and stores output data in one or more inter-stage buffers, and so on. The shared memory 306 and various other stages of the graphics processing pipeline connect with external memory via the memory interface 214.

The primitive distributor and vertex attribute fetch 410 processing unit collects vertex data for high-order surfaces, primitives, and the like, and outputs the vertex data, including the vertex attributes, to vertex processing unit 415. In some embodiments, the primitive distributor and vertex attribute fetch 410 may include a vertex attribute fetch unit that retrieves the vertex attributes and stores the vertex attributes via the memory interface 214. In other embodiments, the primitive distributor and vertex attribute fetch 410 may include a vertex attribute fetch unit that retrieves the vertex attributes from and stores the vertex attributes in the shared memory 306. The vertex processing unit 415 is a programmable execution unit that is configured to execute vertex shader programs, lighting and transforming vertex data as specified by the vertex shader programs. For example, the vertex processing unit 415 may be programmed to transform the vertex data from an object-based coordinate representation (object space) to an alternatively based coordinate system such as world space or normalized device coordinates (NDC) space. The vertex processing unit 415 may read data that is stored in shared memory 306, L1 cache 320, parallel processing memory 204, or system memory 104 by primitive distributor and vertex attribute fetch 410 for use in processing the vertex data. The vertex processing unit 415 stores processed vertices in the inter-stage buffers within the shared memory 306.

The tessellation initialization processing unit 420 is a programmable execution unit that is configured to execute tessellation initialization shader programs. The tessellation initialization processing unit 420 processes vertices produced by the vertex processing unit 415 and generates graphics primitives known as patches. The tessellation initialization processing unit 420 also generates various patch attributes. The tessellation initialization processing unit 420 then stores the patch data and patch attributes in the inter-stage buffers within the shared memory 306. In some embodiments, the tessellation initialization shader program may be called a hull shader or a tessellation control shader.

The task generation unit 425 retrieves data and attributes for vertices and patches from the inter-stage buffers of the shared memory 306. The task generation unit 425 generates tasks for processing the vertices and patches for processing by later stages in the graphics processing pipeline 400.

The task distributor 430 redistributes the tasks produced by the task generation unit 425. The tasks produced by the various instances of the vertex shader program and the tessellation initialization program may vary significantly between one graphics processing pipeline 400 and another. The task distributor 430 redistributes these tasks such that each graphics processing pipeline 400 has approximately the same workload during later pipeline stages.

The topology generation unit 435 retrieves tasks distributed by the task distributor 430. The topology generation unit 435 indexes the vertices, including vertices associated with patches, and computes (U,V) coordinates for tessellation vertices and the indices that connect the tessellated vertices to form graphics primitives. The topology generation unit 435 then stores the indexed vertices in the inter-stage buffers within the shared memory 306.

The tessellation processing unit 440 is a programmable execution unit that is configured to execute tessellation shader programs. The tessellation processing unit 440 reads input data from and writes output data to the inter-stage buffers of the shared memory 306. This output data in the inter-stage buffers is passed to the next shader stage, the geometry processing unit 445 as input data. In some embodiments, the tessellation shader program may be called a domain shader or a tessellation evaluation shader.

The geometry processing unit 445 is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit 445 may be programmed to subdivide the graphics primitives into one or more new graphics primitives and calculate parameters, such as plane equation coefficients, that are used to rasterize the new graphics primitives.

In some embodiments, the geometry processing unit 445 may also add or delete elements in the geometry stream. The geometry processing unit 445 outputs the parameters and vertices specifying new graphics primitives to a viewport scale, cull, and clip unit 450. The geometry processing unit 445 may read data that is stored in shared memory 306, parallel processing memory 204 or system memory 104 for use in processing the geometry data. The viewport scale, cull, and clip unit 450 performs clipping, culling, and viewport transform and outputs processed graphics primitives to a rasterizer 455.

The rasterizer 455 scan converts the new graphics primitives and outputs fragments and coverage data to fragment processing unit 460. Additionally, the rasterizer 455 may be configured to perform z culling and other z-based optimizations.

The fragment processing unit 460 is a programmable execution unit that is configured to execute fragment shader programs, transforming fragments received from the rasterizer 455, as specified by the fragment shader programs. For example, the fragment processing unit 460 may be programmed to perform operations such as perspective correction, texture mapping, shading, blending, and the like, to produce shaded fragments that are output to raster operations unit 465. The fragment processing unit 460 may read data that is stored in shared memory 306, parallel processing memory 204 or system memory 104 for use in processing the fragment data. Fragments may be shaded at pixel, sample, or other granularity, depending on the programmed sampling rate.

The raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory. In various embodiments, the ROP 465 may be located in the memory interface 214, in the GPCs 208, in the processing cluster array 230 outside of the GPCs, or in a separate unit (not shown) within the PPUs 202.

Power Efficient Attribute Handling for Tessellation and Geometry Shaders

As described above in conjunction with FIG. 4, SMs 310 within one or more of the PPUs 202 of FIG. 2 may be configured to implement at least a portion of the graphics processing pipelines 400. An SM 310 may be configured to perform the functions of one or more of a vertex processing unit 415, a tessellation initialization processing unit 420, a tessellation processing unit 440, a geometry processing unit 445, and a fragment processing unit 460. The functions of primitive distributor and vertex attribute fetch 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215.

In some embodiments, each graphics processing pipeline 400 may be divided into a world space pipeline and a screen space pipeline. The world space pipeline processes graphics objects in 3D space, where the position of each graphics object is known relative to other graphics objects and relative to a 3D coordinate system. The screen space pipeline processes graphics objects that have been projected from the 3D coordinate system onto a 2D planar surface representing the surface of the display device 110. For example, the world space pipeline could include pipeline stages in the graphics processing pipeline 400 from the primitive distributor and vertex attribute fetch 410 through the viewport scale, cull, and clip unit 450. The screen space pipeline could include pipeline stages in the graphics processing pipeline 400 from the rasterizer 455 through the raster operations unit 465.

In some embodiments, the world space pipeline may be further divided into an alpha phase pipeline and a beta phase pipeline. For example, the alpha phase pipeline could include pipeline stages in the graphics processing pipeline 400 from the primitive distributor and vertex attribute fetch 410 through the task generation unit 425. The beta phase pipeline could include pipeline stages in the graphics processing pipeline 400 from the topology generation unit 435 through the viewport scale, cull, and clip unit 450. The graphics processing pipeline 400, including an associated SM 310, performs a first set of operations during processing in the alpha phase pipeline and a second set of operations during processing in the beta phase pipeline. As used herein, a set of operations is defined as one or more instructions executed by a single thread, by a thread group, or by a CTA.

The attributes associated with a set of graphics objects may be divided so that each graphics processing pipeline 400 has approximately the same amount of workload through the alpha phase. Alpha phase processing may significantly expand the quantity of graphics object attributes, such that the quantity of attributes produced by the task generation unit 425 is significantly larger than the quantity of attributes retrieved by the primitive distributor and vertex attribute fetch 410. Further, the task generation unit 425 associated with one graphics processing pipeline 400 may produce a significantly greater quantity of attributes than the task generation unit 425 associated with another graphics processing pipeline 400, even in cases where the two graphics processing pipelines 400 process the same quantity of attributes at the beginning of the alpha phase pipeline. In such cases, the task distributor 430 redistributes the attributes produced by the alpha phase pipeline such that each graphics processing pipeline 400 has approximately the same workload at the beginning of the beta phase pipeline.

Figure 5:
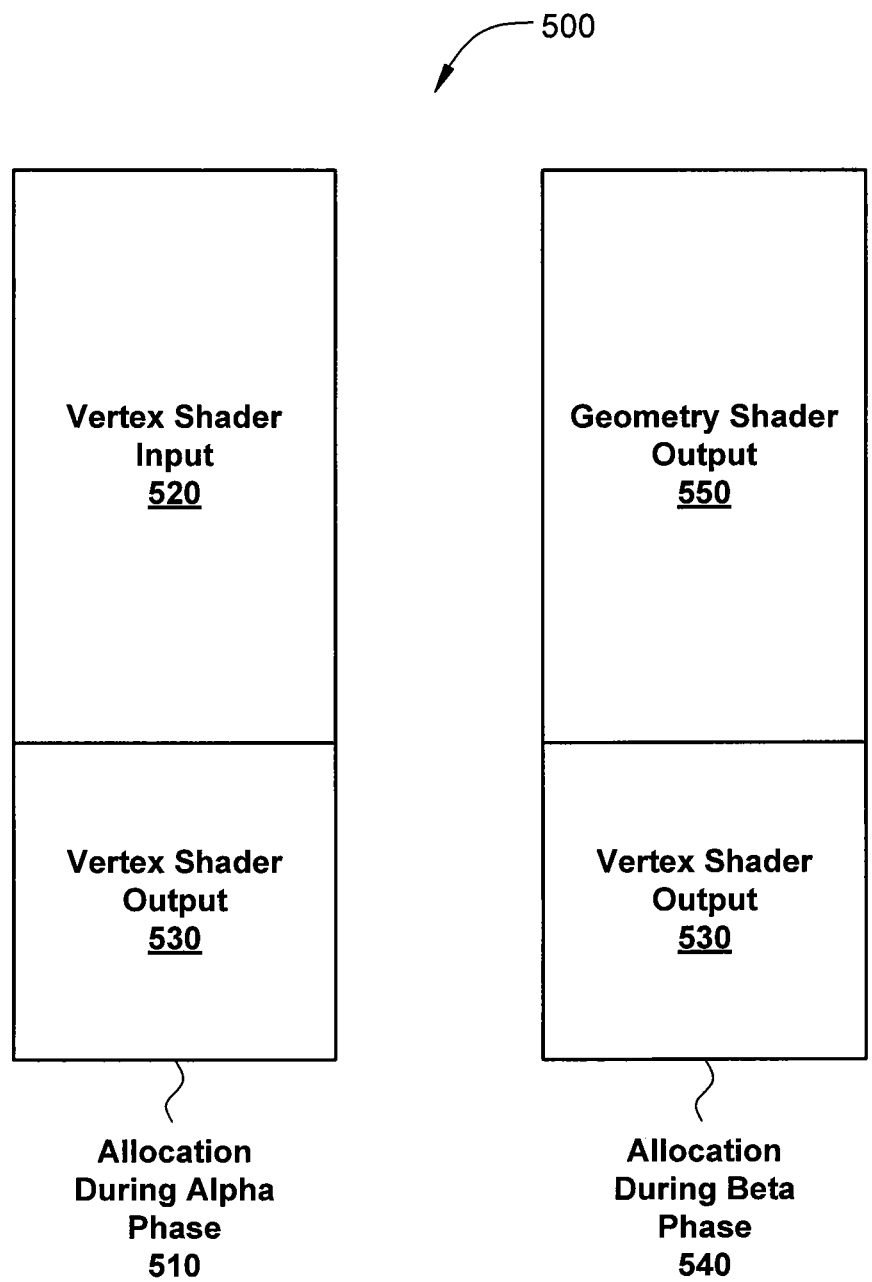
FIG. 5 illustrates an allocation map of the shared memory of FIG. 3B, according to one embodiment of the invention.

FIG. 5 illustrates an allocation map 500 of the shared memory 306 of FIG. 3B, according to one embodiment of the invention. As shown, the allocation map 500 includes an allocation during alpha phase 510 and an allocation during beta phase 540.

The allocation during alpha phase 510 illustrates the allocation of the shared memory 306 prior to execution of the vertex shader program by the vertex processing unit 415. As shown, the allocation includes a segment for vertex shader input 520 and a section for vertex shader output 530. The vertex shader input 520 includes parameters associated with graphics objects assigned to the vertex shader program by the primitive distributor and vertex attribute fetch 410. The vertex processing unit 415 retrieves the parameters from the vertex shader input 520 and processes the associated graphics objects according to the vertex shader program. The vertex processing unit 415 then stores modified attributes in the vertex shader output 530. In some embodiments, the graphics objects may not undergo tessellation. In such cases, the tessellation input processing unit 420 and tessellation processing unit 440 are bypassed, and the task generation unit 425 retrieves the vertex shader output 530 directly. As described above in conjunction with FIG. 4, the task generation unit prepares tasks for the beta phase pipeline.

Because the various instances of the vertex shader program may generate differing quantities of workload from each other, the task distributor 430 redistributes tasks among the graphics processing pipelines 400 prior to processing by the beta phase pipeline. As a result, a graphics object processed by a given graphics processing pipeline during the alpha phase may not necessarily be processed by the same graphics processing pipeline 400 during the beta phase. For example, a vertex processing unit 415 could process a single graphics object during the alpha phase and, as a result, produce a large quantity of resulting graphics objects. In such cases, the task distributor 430 could redistribute the graphics objects to one or more graphics processing pipelines 400 for the beta phases, which may or may not include the graphics processing pipeline 400 that processed the graphics object during the alpha phase. If all the graphics processing pipelines 400 assigned to process graphics objects for the beta phase are in the same SM 310 as the graphics processing pipelines assigned for the alpha phase, then the vertex shader output 530 need not be copied to an external memory such as the L2 cache 350. Rather, the vertex shader output 530 remains resident in the local shared memory 306 for processing during the beta phase.

The allocation during beta phase 540 illustrates the allocation of the shared memory 306 prior to execution of the geometry shader program by the geometry processing unit 445. As shown, the allocation includes the segment for vertex shader output 530 and a section for geometry shader output 550. The vertex shader output 530 includes parameters associated with graphics objects assigned to the geometry shader program by the task distributor 430. The topology generation unit 435 indexes the vertices from the vertex shader output 530 and computes texture coordinates corresponding to the vertices. The geometry processing unit 445 retrieves the indexed parameters from the vertex shader output 530 and processes the associated graphics objects according to the geometry shader program. The geometry processing unit 445 then stores further modified attributes in the geometry shader output 550. The geometry shader output 550 is then transferred to the screen space pipeline.

In a system with a single SM 310, the same SM 310 processes both the alpha and beta workload. As such, attributes associated with graphics objects may remain resident in memory local to the SM 310, such as the shared memory 306, between the alpha and beta phase. Alpha phase data remains in place in the shared memory 306 of the SM 310 and is not copied to the L2 cache 350. Beta workload that is redistributed among the graphics processing pipelines 400 within the SM 310 is retrieved by the graphics processing pipelines 400 from the local shared memory 306.

In some embodiments, the vertex shader input 520, vertex shader output 530, and geometry shader output 550 regions of the shared memory 306 may be configured using a first-in first-out (FIFO) allocation policy, providing for a simplified hardware implementation and avoiding deadlock. The first region may be allocated for vertex shader input 520 during the alpha phase and may be allocated for geometry shader output 550 during the beta phase. The vertex shader input 520 may be deallocated once the instances of the vertex shader program have completed processing. After the vertex shader input 520 is deallocated, the first region may be allocated for geometry shader output 550. The second region may be allocated for vertex shader output 530 from the alpha phase to store attributes generated by the last alpha stage shading program. The data in the vertex shader output 530 region may remain resident in shared memory 306 and allocated after all alpha warps have completed execution. During the beta phase, the instances of the geometry shader program may directly access input attributes from the vertex shader output 530 allocated in the second region. The vertex shader output 530 may be deallocated once the instances of the geometry shader program have completed processing. The geometry shader output 550 may be deallocated once the data in the geometry shader output 550 is transferred to the screen space pipeline.

After completing beta phase processing, both the vertex shader output 530 and geometry shader output 550 regions of the shared memory 306 are available for a subsequent alpha phase for other graphics objects. The processing continues with the graphics pipelines alternating between alpha and beta phases for different sets of graphics objects, transferring attributes using the two regions within the local shared memory 306.

In some embodiments, the vertex shader program may have more vertex data to process than can be stored in the vertex shader input 520. In such cases, the vertex shader program may process vertex data stored in the vertex shader input 520, storing results in the vertex shader output 530, until the vertex shader input 520 is nearly empty. Portions of the vertex shader input 520 may be deallocated, and then reallocated to receive additional vertex data for processing. The vertex shader program may continue to process vertex data until the vertex shader output 530 is nearly full. The graphics processing pipeline 400 may then enter the beta phase to process the data stored in the vertex shader output 530.

In some embodiments, processing the vertex shader output 530 may result in the production of more data than can be stored in the geometry shader output 550. In such cases, the geometry shader program may process graphics objects and store output data in the geometry shader output 550 until the geometry shader output 550 is nearly full. The geometry shader output 550 may then be transferred to the screen space pipeline, and the geometry shader output 550 may be deallocated. The geometry shader program may continue to process graphics objects and store output data in the geometry shader output 550 until the geometry shader output 550 is nearly full again. The geometry shader output 550 may again be transferred to the screen space pipeline. The process may continue until beta processing completes.

In such cases, the size of the vertex shader output 530 region may be sized to store the maximum size of the data output from a single warp of a vertex shader program. The vertex shader input 520/geometry shader output 550 region may be sized to store the maximum size of the data input from a single warp of a vertex shader program or the maximum size of the data output from a single warp of a geometry shader program. For example, the size of the vertex shader output 530 region could be 16.75 kbytes, and the size of the vertex shader input 520/geometry shader output 550 region could be 31.25 kbytes. The total size of the shared memory 306 would be 48 kbytes.

Figure 6:
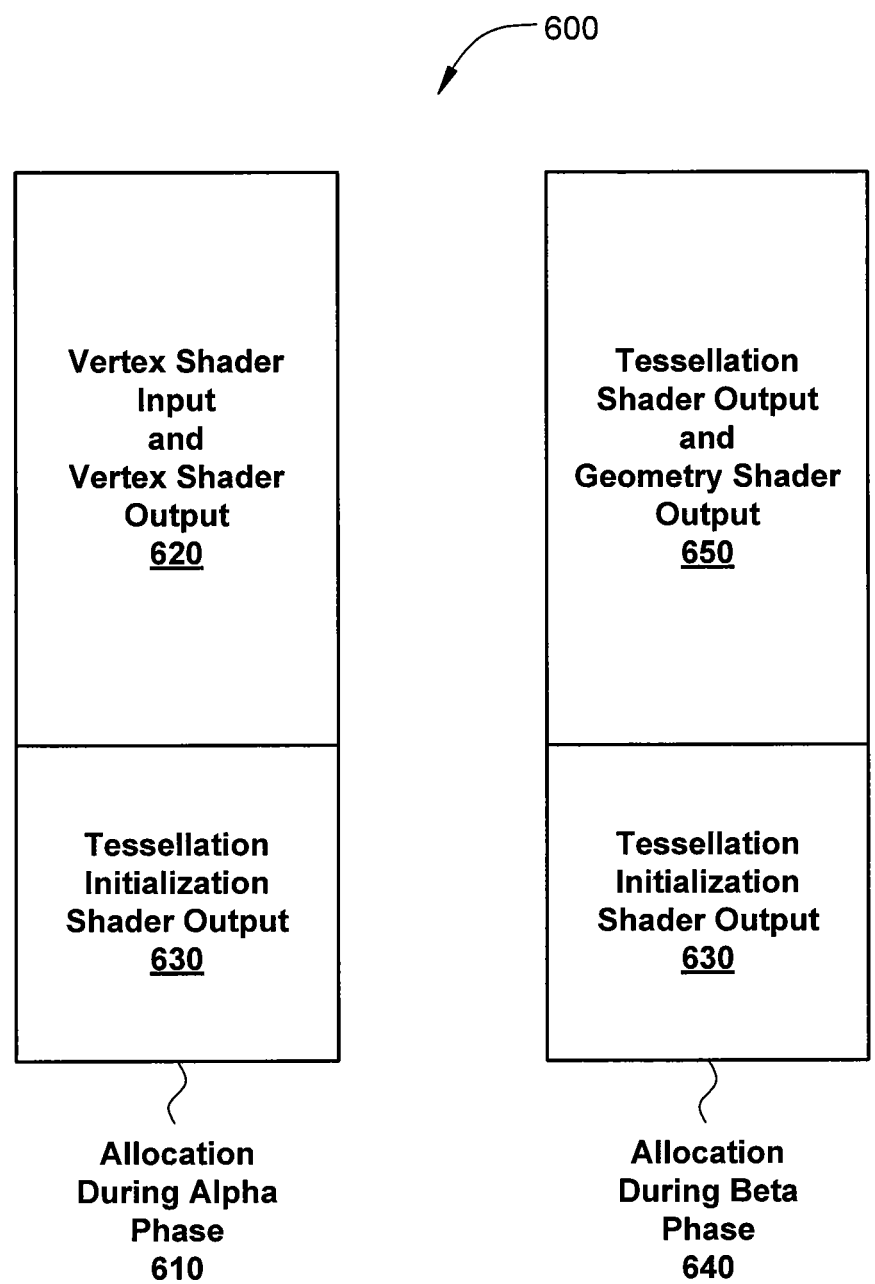
FIG. 6 illustrates an allocation map of the shared memory of FIG. 3B, according to another embodiment of the invention.

FIG. 6 illustrates an allocation map 600 of the shared memory 306 of FIG. 3B, according to another embodiment of the invention. As shown, the allocation map 600 includes an allocation during alpha phase 610 and an allocation during beta phase 640. The allocation during alpha phase 610 and the allocation during beta phase 640 function substantially the same as analogous allocations in FIG. 5, except as further described below.

The allocation during alpha phase illustrates the allocation of the shared memory 306 prior to execution of the vertex shader program by the vertex processing unit 415. As shown, the allocation includes a segment for vertex shader input and vertex shader output 620 and a section for tessellation initialization shader output 530. The vertex processing unit 415 retrieves parameters from the vertex shader input and vertex shader output 620 and processes the associated graphics objects according to the vertex shader program. The vertex processing unit 415 then stores modified attributes in the vertex shader input and vertex shader output 620. The tessellation initialization processing unit 420 retrieves graphics objects processed by the vertex processing unit 415 from the vertex shader input and vertex shader output 620 and processes the associated graphics objects according to the tessellation initialization shader program. The tessellation input processing unit 420 then stores the modified attributes associated with the graphics objects in the tessellation initialization shader output 630. The task generation unit 425 retrieves the tessellation initialization shader output 630. As described above in conjunction with FIG. 4, the task generation unit prepares tasks for the beta phase pipeline.

Because the various instances of the tessellation initialization shader program may generate differing quantities of workload from each other, the task distributor 430 redistributes tasks among the graphics processing pipelines 400 prior to processing by the beta phase pipeline. As a result, a graphics object processed by a given graphics processing pipeline during the alpha phase may not necessarily be processed by the same graphics processing pipeline 400 during the beta phase. For example, a tessellation initialization processing unit 420 could process a single graphics object during the alpha phase and, as a result, produce a large quantity of resulting graphics objects. In such cases, the task distributor 430 could redistribute the graphics objects to one or more graphics processing pipelines 400 for the beta phases, which may or may not include the graphics processing pipeline 400 that processed the graphics object during the alpha phase. If all the graphics processing pipelines 400 assigned to process graphics objects for the beta phase are in the same SM 310 as the graphics processing pipelines 400 assigned for the alpha phase, then the tessellation initialization shader output 630 need not be copied to an external memory such as the L2 cache 350. Rather, the tessellation initialization shader output 630 remains resident in the local shared memory 306 for processing during the beta phase.

The allocation during beta phase 640 illustrates the allocation of the shared memory 306 prior to execution of the tessellation shader program by the tessellation processing unit 440. As shown, the allocation includes the segment for tessellation initialization shader output 630 and a section for tessellation shader output and geometry shader output 650. The tessellation initialization shader output 630 includes parameters associated with graphics objects assigned to the tesselation shader program by the task distributor 430. The topology generation unit 435 indexes the vertices from the tessellation initialization shader output 630 and computes (U,V) coordinates for tessellation vertices and the indices that connect the tessellated vertices to form graphics primitives. The tessellation processing unit 440 retrieves the indexed parameters from the tessellation initialization shader output 630 and processes the associated graphics objects according to the tessellation shader program. The tessellation processing unit 440 then stores results in the tessellation shader output portion of the tessellation shader output and geometry shader output 650. The geometry processing unit 445 then retrieves the tessellation shader results from the tessellation shader output portion of the tessellation shader output and geometry shader output 650 and processes the associated graphics objects according to the geometry shader program. The geometry processing unit 445 then stores further modified attributes in the geometry shader output portion of the tessellation shader output and geometry shader output 650. The geometry shader output is then transferred to the screen space pipeline.

It will be appreciated that the architecture described herein is illustrative only and that variations and modifications are possible. In one example, the techniques are described herein in the context of a shared memory 306 with a storage capacity of 48 kbytes and a specific segmentation between two portions of the shared memory 306. However, the described techniques could be employed using a shared memory 306 of any technically feasible size or segmentation split. In another example, the segmentation between the two portions of shared memory may be fixed or may be changed dynamically during graphics processing.

Figure 7A:
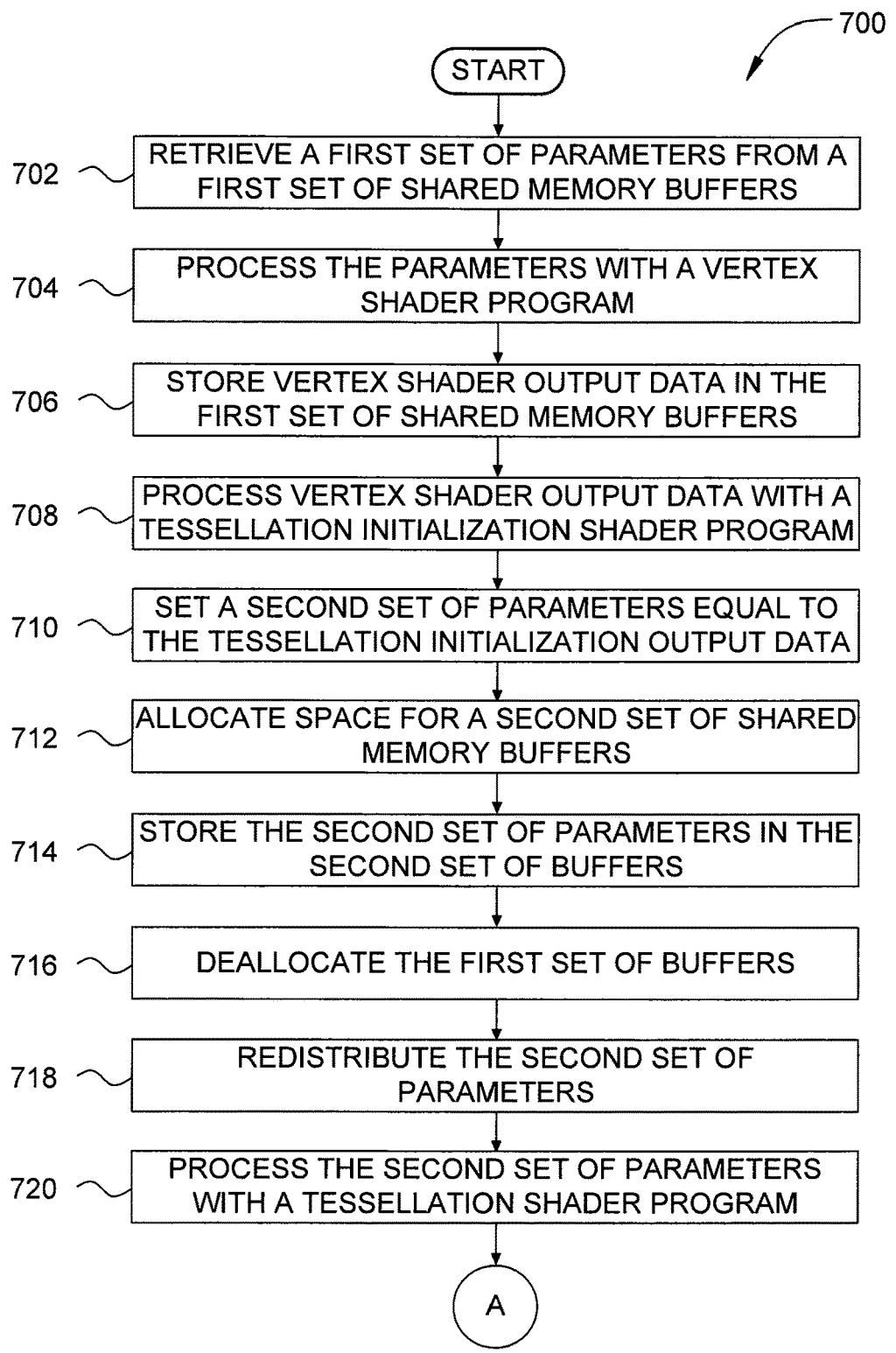
FIGS. 7A-7B set forth a flow diagram of method steps for redistributing attributes of graphics objects being processed by a graphics processing unit, according to one embodiment of the present invention.
Figure 7B:
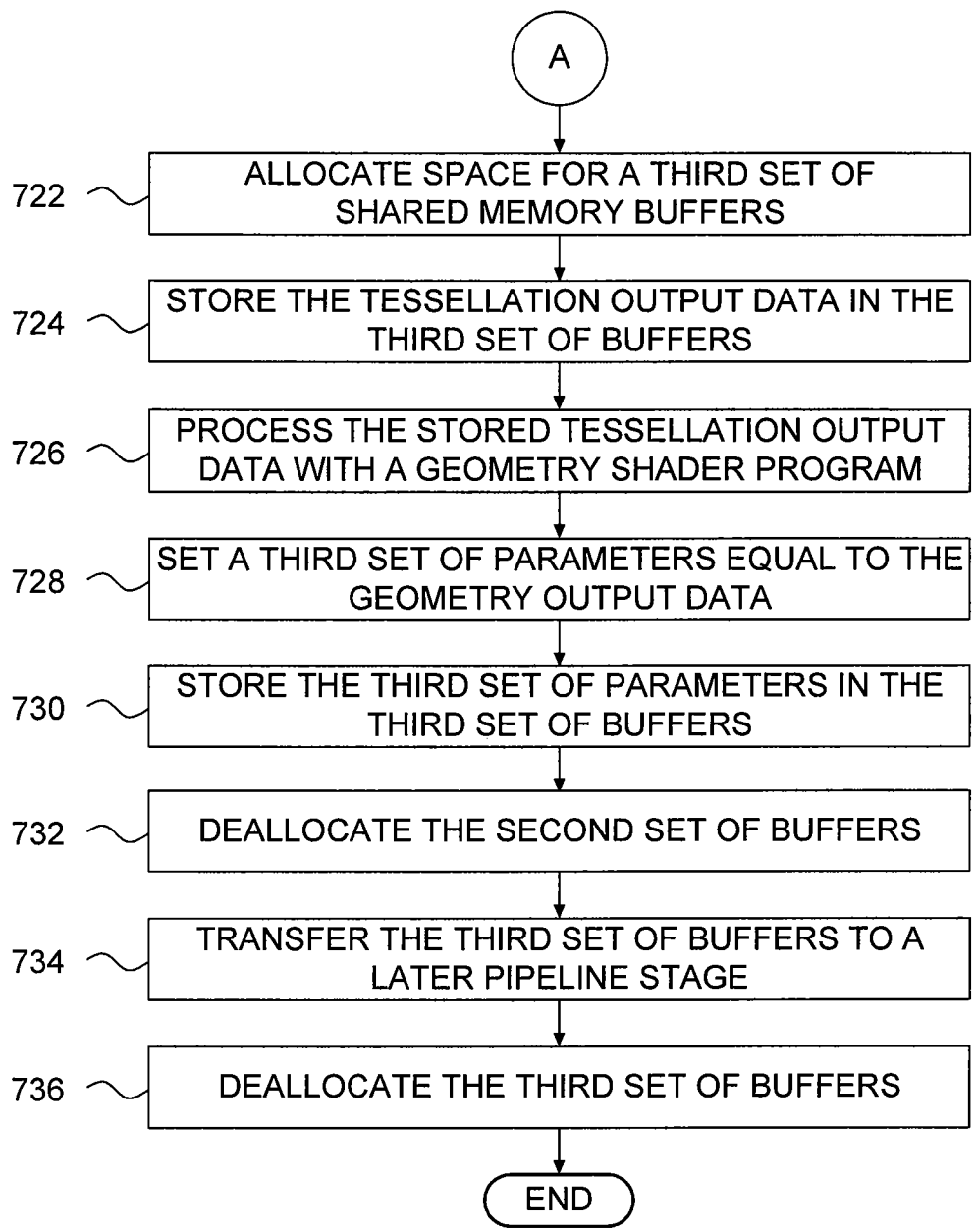

FIGS. 7A-7B set forth a flow diagram of method steps for redistributing attributes of graphics objects being processed by a graphics processing unit, according to one embodiment of the present invention. Although the method steps are described in conjunction with the systems of FIGS. 1-6, persons of ordinary skill in the art will understand that any system configured to perform the method steps, in any order, is within the scope of the inventions.

As shown, a method 700 begins at step 702, where the SM 310 retrieves a first set of parameters associated with a set of graphics objects from a first set of buffers within a first portion of a shared memory, where the first set of buffers has been previously allocated. At step 704, the SM 310 processes the first set of parameters with a vertex shader program executed by a vertex processing unit, resulting in vertex output data. At step 706, the SM 310 stores the vertex output data in the first set of buffers. At step 708, the SM 310 processes the stored vertex output data with a tessellation initialization shader program executed by a tessellation initialization processing unit, resulting in tessellation initialization output data. At step 710, the SM 310 sets a second set of parameters as the tessellation initialization output data. At step 712, the SM 310 allocates space for the second set of buffers within a second portion of the shared memory for storage of the second set of parameters. At step 714, the SM 310 stores the second set of parameters in the second set of buffers. At step 716, the SM 310 deallocates the first set of buffers.

At step 718, the SM 310 redistributes the second set of parameters among the graphics processing pipelines in the plurality of graphics processing pipelines prior to further processing. At step 720, the SM 310 processes the second set of parameters with a tessellation shader program executed by a tessellation processing unit, resulting in tessellation output data. At step 722, the SM 310 allocates space for a third set of buffers within the first portion of the shared memory for storage. At step 724, the SM 310 stores the tessellation output data in the third set of buffers. At step 726, the SM 310 processes the stored tessellation output data with a geometry shader program executed by a geometry processing unit, resulting in geometry output data. At step 728, the SM 310 sets a third set of parameters as the geometry output data. At step 730, the SM 310 stores the third set of parameters in the third set of buffers. At step 732, the SM 310 deallocates the second set of buffers. At step 734, the SM 310 transfers the third set of buffers to a later stage in the pipeline stage in one or more graphics processing pipelines 400 within the SM 310. For example, the SM 310 transfers the third set of buffers to the viewport scale, cull, and clip unit 450 of the graphics processing pipeline 400. At step 736, the SM 310 deallocates the third set of buffers. The method 700 then terminates.

In sum, attributes associated with one or more graphics objects are stored in a first portion of a shared memory that is local to a streaming multiprocessor (SM). The SM distributes the attributes to graphics processing pipelines for processing. The graphics processing pipelines retrieve the attributes from the first portion of the shared memory. The graphics processing pipelines perform operations related to a first phase of graphics processing, creating modified attributes for use in a second phase of graphics processing. The graphics processing pipelines store the modified attributes in a second portion of the shared memory. The SM then redistributes the modified attributes to the graphics processing pipelines in preparation for the second phase of graphics processing. The graphics processing pipelines retrieve the modified attributes from the second portion of the shared memory. The graphics processing pipelines perform operations related to the second phase of graphics processing, creating further modified attributes for additional graphics processing. The graphics processing pipelines store the further modified attributes in the first portion of the shared memory. The further modified attributes are then transferred from the first portion of the shared memory to later stages in the graphics processing pipelines.

One advantage of the disclosed techniques is that work is redistributed in a single streaming multiprocessor system from a first phase of graphics processing to a second phase of graphics processing without having to copy the attributes of the graphics objects to the cache or system memory and then later retrieve the attributes from one of those memories. Copying attributes to and retrieving attributes from a remote memory, such as the cache or system memory, typically involves energizing multiple off-chip memory, controller, and interface components in a multilevel memory hierarchy. Copying to and retrieving from a remote memory may also involve transitioning some components from a low power consumption state to a high power consumption state. Accessing a local shared memory typically does not involve energizing or changing power state of off-chip components. Consequently, the disclosed techniques reduce overall power consumption and serve to extend the operating time between battery charging cycles in mobile devices.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for processing attributes of graphics objects in a plurality of graphics processing pipelines, the method comprising:

retrieving, by a first streaming multiprocessor implementing at least a portion of a first graphics processing pipeline, a first set of parameters associated with a set of graphics objects from a first set of buffers, wherein the first set of buffers is located within a first portion of a shared memory local to the first streaming multiprocessor, wherein the first portion is allocated to the at least a portion of the first graphics pipeline in a first phase of processing;

performing, by the first streaming multiprocessor while implementing the at least a portion of the first graphics processing pipeline, a first set of operations on the first set of parameters according to the first phase of processing to produce a second set of parameters;

storing, by the first streaming multiprocessor while implementing the at least a portion of the first graphics processing pipeline, the second set of parameters in a second set of buffers, wherein the second set of buffers is located within a second portion of the shared memory allocated to the at least a portion of the first graphics pipeline in the first phase of processing, wherein a size of the second portion of the shared memory is determined based on a maximum size of data produced by one group of concurrently executing threads in the first phase of processing;

initiating a second phase of processing in response to determining that the second portion of the shared memory is filled to a given amount;

without using off-chip cache memory, redistributing the second set of parameters stored in the second set of buffers across each of two or more second graphics processing pipelines implemented by the first streaming multiprocessor for the second phase of processing; and performing, by the first streaming multiprocessor while implementing at least a portion of each of the two or more second graphics processing pipelines, a second set of operations on the second set of parameters according to a second phase of processing to produce a third set of parameters, wherein the first set of buffers and the second set of buffers reside in the shared memory and not in off-chip cache memory or frame buffer memory.

2. The method of claim 1 further comprising:
allocating space for the first set of buffers within the first portion of the shared memory; and
allocating space for the second set of buffers within the second portion of the shared memory.

3. The method of claim 2, further comprising:
deallocating space for the first set of buffers;
allocating space for a fourth set of buffers within the first portion of the shared memory;
retrieving a fourth set of parameters associated with the set of graphics objects from the fourth set of buffers;
performing the first set of operations on the fourth set of parameters according to the first phase of processing to produce a fourth set of parameters; and
storing the fourth set of parameters in the second set of buffers.

4. The method of claim 2 further comprising:
allocating the first portion of the shared memory to the at least a portion of each of the two or more second graphics processing pipelines in the second phase of processing in response to the first phase of processing being completed and the first streaming multiprocessor implementing the at least a portion of each of the two or more second graphics processing pipelines;
storing, by the first streaming multiprocessor while implementing the at least a portion of each of the two or more second graphics processing pipelines, the third set of parameters in a third set of buffers, wherein the third set of buffers is located within the first portion of the shared memory;
deallocating the space for the first set of buffers; and
allocating space for the third set of buffers within the first portion of the shared memory.

5. The method of claim 4, further comprising:
deallocating the space for the third set of buffers;
allocating space for a fourth set of buffers within the second portion of the shared memory;
performing the second set of operations on the second set of parameters according to the second phase of processing to produce a fourth set of parameters; and
storing the fourth set of parameters in the fourth set of buffers.

6. The method of claim 2, wherein the first portion of the shared memory and the second portion of the shared memory have a fixed size.

7. The method of claim 1, further comprising:
allocating the first portion of the shared memory to the at least a portion of each of the two or more second graphics processing pipelines in the second phase of processing in response to the first phase of processing being completed and the first streaming multiprocessor implementing the at least a portion of each of the two or more second graphics processing pipelines;
storing, by the first streaming multiprocessor while implementing the at least a portion of each of the two or more second graphics processing pipelines, the third set of parameters in a third set of buffers, wherein the third set of buffers is located within the first portion of the shared memory; and
transferring contents of the third set of buffers to a screen-space graphics pipeline that includes a rasterizer for further processing.

8. The method of claim 1, wherein performing the first set of operations comprises:
processing the first set of parameters with a vertex shader program executed by a vertex processing unit to produce vertex output data; and
specifying the second set of parameters as the vertex output data.

9. The method of claim 8, wherein performing the second set of operations comprises:
processing the second set of parameters with a geometry shader program executed by a geometry processing unit to produce geometry output data;
and specifying the third set of parameters as the geometry output data.

10. The method of claim 1, wherein performing the first set of operations comprises:
processing the first set of parameters with a vertex shader program executed by a vertex processing unit to produce vertex output data;
storing the vertex output data in the first set of buffers;
processing the stored vertex output data with a tessellation initialization shader program executed by a tessellation initialization processing unit to produce tessellation initialization output data; and
specifying the second set of parameters as the tessellation initialization output data.

11. The method of claim 10, wherein performing the second set of operations comprises:
processing the second set of parameters with a tessellation shader program executed by a tessellation processing unit to produce tessellation output data;
storing the tessellation output data in a third set of buffers;
processing the stored tessellation output data with a geometry shader program executed by a geometry processing unit to produce geometry output data;
and specifying the third set of parameters as the geometry output data.

12. The method of claim 1, wherein the first phase of processing comprises performing alpha phase operations on the set of graphics objects, and the second phase of processing comprises performing beta phase operations on the set of graphics objects.

13. A subsystem, comprising:
a shared memory that is local to a first streaming multiprocessor; and
the first streaming multiprocessor that is coupled to the shared memory and implements a plurality of graphics processing pipelines, wherein the first streaming multiprocessor processes attributes of graphics objects within the plurality of graphics processing pipelines by performing the steps of:
retrieving, when implementing at least a portion of a first graphics processing pipeline, a first set of parameters associated with a set of graphics objects from a first set of buffers, wherein the first set of buffers is located within a first portion of a shared memory local to the first streaming multiprocessor, wherein the first portion is allocated to the at least a portion of the first graphics pipeline in a first phase of processing;
performing, while implementing the at least a portion of the first graphics processing pipeline, a first set of operations on the first set of parameters according to the first phase of processing to produce a second set of parameters;
storing, while implementing the at least a portion of the first graphics processing pipeline, the second set of parameters in a second set of buffers, wherein the second set of buffers is located within a second portion of the shared memory allocated to the at least a portion of the first graphics pipeline in the first phase of processing, wherein a size of the second portion of the shared memory is determined based on a maximum size of data produced by one group of concurrently executing threads in the first phase of processing;

initiating a second phase of processing in response to determining that the second portion of the shared memory is filled to a given amount;

without using off-chip cache memory, redistributing the second set of parameters stored in the second set of buffers across each of two or more second graphics processing pipelines also implemented by the first streaming multiprocessor for the second phase of processing; and performing, while implementing at least a portion of each of the two or more second graphics processing pipelines, a second set of operations on the second set of parameters according to a second phase of processing to produce a third set of parameters, wherein the first set of buffers and the second set of buffers reside in the shared memory and not in off-chip cache memory or frame buffer memory.

14. The subsystem of claim 13 wherein the first streaming multiprocessor further performs the steps of:
allocating space for the first set of buffers within the first portion of the shared memory; and
allocating space for the second set of buffers within the second portion of the shared memory.

15. The subsystem of claim 14 wherein the first streaming multiprocessor further performs the steps of:
allocating the first portion of the shared memory to the at least a portion of each of the two or more second graphics processing pipelines in the second phase of processing in response to the first phase of processing being completed and the first streaming multiprocessor implementing the at least a portion of each of the two or more second graphics processing pipelines;
storing, by the first streaming multiprocessor while implementing the at least a portion of each of the two or more second graphics processing pipelines, the third set of parameters in a third set of buffers, wherein the third set of buffers is located within the first portion of the shared memory; and
deallocating the space for the first set of buffers; and
allocating space for the third set of buffers within the first portion of the shared memory.

16. The subsystem of claim 14, wherein the first portion of the shared memory and the second portion of the shared memory have a fixed size.

17. The subsystem of claim 13, wherein the first streaming multiprocessor further performs the steps of:
allocating the first portion of the shared memory to the at least a portion of each of the two or more second graphics processing pipelines in the second phase of processing in response to the first phase of processing being completed and the first streaming multiprocessor implementing the at least a portion of each of the two or more second graphics processing pipelines;
storing, by the first streaming multiprocessor while implementing the at least a portion of each of the two or more second graphics processing pipelines, the third set of parameters in a third set of buffers, wherein the third set of buffers is located within the first portion of the shared memory; and transferring contents of the third set of buffers to a screen-space graphics pipeline that includes a rasterizer for further processing.

18. The subsystem of claim 13, wherein performing the first set of operations comprises:
processing the first set of parameters with a vertex shader program executed by a vertex processing unit to produce vertex output data; and
specifying the second set of parameters as the vertex output data.

19. The subsystem of claim 18, wherein performing the second set of operations comprises:
processing the second set of parameters with a geometry shader program executed by a geometry processing unit to produce geometry output data; and
specifying the third set of parameters as the geometry output data.

20. The subsystem of claim 13, wherein performing the first set of operations comprises:
processing the first set of parameters with a vertex shader program executed by a vertex processing unit to produce vertex output data;
storing the vertex output data in the first set of buffers;
processing the stored vertex output data with a tessellation initialization shader program executed by a tessellation initialization processing unit to produce tessellation initialization output data; and
specifying the second set of parameters as the tessellation initialization output data.

21. The subsystem of claim 20, wherein performing the second set of operations comprises:
processing the second set of parameters with a tessellation shader program executed by a tessellation processing unit to produce tessellation output data;
storing the tessellation output data in a third set of buffers;
processing the stored tessellation output data with a geometry shader program executed by a geometry processing unit to produce geometry output data; and
specifying the third set of parameters as the geometry output data.

22. A computing device, comprising:
a system memory; and
a subsystem that includes a first streaming multiprocessor that is coupled to a local shared memory and implements a plurality of graphics processing pipelines, where the first streaming multiprocessor processes attributes of graphics objects within the plurality of graphics processing pipelines by performing the steps of:
retrieving, when implementing at least a portion of a first graphics processing pipeline, a first set of parameters associated with a set of graphics objects from a first set of buffers, wherein the first set of buffers is located within a first portion of a shared memory local to the first streaming multiprocessor, wherein the first portion is allocated to the at least a portion of the first graphics pipeline in a first phase of processing;
performing, while implementing the at least a portion of the first graphics processing pipeline, a first set of operations on the first set of parameters according to the first phase of processing to produce a second set of parameters;
storing, while implementing the at least a portion of the first graphics processing pipeline, the second set of parameters in a second set of buffers, wherein the second set of buffers is located within a second portion of the shared memory allocated to the at least a portion of the first graphics pipeline in the first phase of processing, wherein a size of the second portion of the shared memory is determined based on a maximum size of data produced by one group of concurrently executing threads in the first phase of processing;

initiating a second phase of processing in response to determining that the second portion of the shared memory is filled to a given amount;

without using off-chip cache memory, redistributing the second set of parameters stored in the second set of buffers across each of two or more second graphics processing pipelines implemented by the first streaming multiprocessor for the second phase of processing; and performing, while implementing at least a portion of each of the two or more second graphics processing pipelines, a second set of operations on the second set of parameters according to a second phase of processing to produce a third set of parameters, wherein the first set of buffers, the second set of buffers, and the third set of buffers reside in the shared memory and not in off-chip cache memory or frame buffer memory.

* * * * *